United States Patent [19]

Shuskus

[11] 3,731,163

[45] May 1, 1973

[54] LOW VOLTAGE CHARGE STORAGE MEMORY ELEMENT

[75] Inventor: Alexander J. Shuskus, West Hartford, Conn.

[73] Assignee: United Aircraft Corporation, East Hartford, Conn.

[22] Filed: Mar. 22, 1972

[21] Appl. No.: 237,042

[52] U.S. Cl. .............................317/235 R, 317/235 B

[51] Int. Cl. .............................................H01l 11/14

[58] Field of Search .......................317/234 U, 235 B, 317/46.5; 307/238

[56] References Cited

UNITED STATES PATENTS

| | | | |
|---|---|---|---|
| 3,665,423 | 5/1972 | Nakanuma et al. | 307/238 |
| 3,202,891 | 8/1965 | Frankl | 317/234 |
| 3,426,255 | 2/1969 | Heywang | 317/235 |
| 3,663,870 | 5/1972 | Tsutsumi et al. | 317/235 |

OTHER PUBLICATIONS

IBM Tech. Discl. Bul. "Metal–Insulator–Trap-Oxide–Semiconductor Memory Cell" by Agusta et al. May 1971, page 3,636.

*Primary Examiner*—Jerry D. Craig
*Attorney*—Melvin Pearson Williams

[57] ABSTRACT

A variable threshold, dual insulator, insulated gate field effect transistor charge storage memory element comprises a relatively thin barrier layer of silicon dioxide adjacent to the semiconductor surface which has disposed thereon, beneath the gate metalization, a somewhat thicker layer of an insulator having a dielectric constant over 18. Dielectric materials include: strontium titanate ($SrTiO_3$), titanium dioxide ($TiO_2$), lead zirconate ($PbZrO_3$); refractory metal oxides, such as hafnium dioxide ($HfO_2$), zirconium dioxide ($ZrO_2$), tantalum oxide ($Ta_2O_5$), and tungsten oxide ($WO_3$); rare earth metal oxides; and ferroelectrics and antiferroelectrics.

2 Claims, 1 Drawing Figure

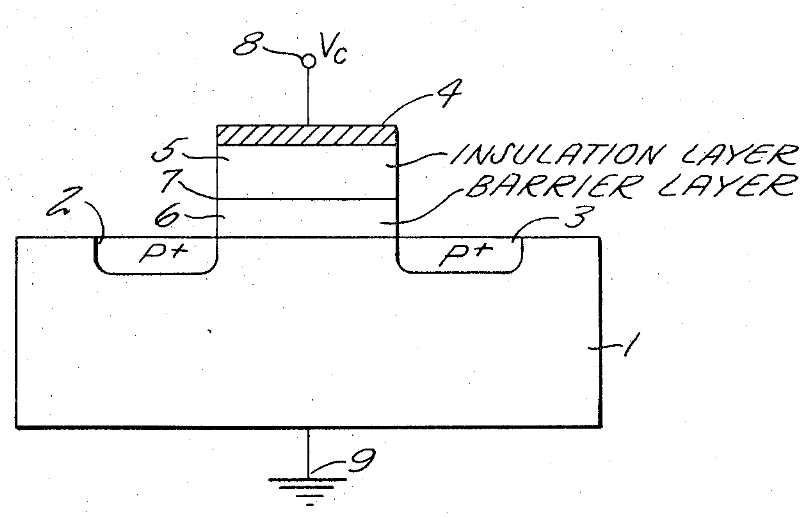
8
Vc
4
5
INSULATION LAYER
7
BARRIER LAYER
6
2
p+
p+
3
1
9

LOW VOLTAGE CHARGE STORAGE MEMORY ELEMENT

BACKGROUND OF THE INVENTION

1. Field of Invention

This invention relates to charge storage memory elements, and more particularly to a low voltage, dual insulator, insulated gate field effect transistor charge storage memory element.

2. Description of the Prior Art

A memory element which is not electrically volatile, known to the prior art, comprises a dual insulator, insulated gate field effect transistor (IGFET) having a relatively thin barrier layer of silicon dioxide adjacent to the semiconductor surface with a somewhat thicker layer of an insulating material between it and the gate metalization. The insulating layers known to the prior art are typically silicon nitride ($Si_3N_4$) and aluminum oxide ($Al_2O_3$). In one form of such device, which may comprise a p-channel enhancement mode insulated gate field effect transistor, the silicon dioxide layer is on the order of 30 A thick so as to permit reasonably high tunnelling currents upon the application of a suitable electric field. As is known, tunnelling takes place in silicon dioxide when the electric field intensity is on the order of $10^7$V/CM. In order to have a device which will retain charge for long periods of time, the silicon dioxide layer must be well insulated from the gate metalization. Thus an insulation layer, of typically 300 A – 1,000 A, is used. This requires that the charge voltage, which is applied to effect the proper field for tunnelling in the silicon dioxide be on the order of, say, 60 volts for silicon nitride and 40 volts for aluminum oxide. As is known, integrated semiconductor circuits operate with voltages more on the order of 5 to 10 volts. It is therefore extremely difficult to provide integrated circuits on a single monolithic silicon substrate having both charge storage memory elements and address decode circuitry thereon.

SUMMARY OF INVENTION

The object of the present invention is to provide a charge storage memory element capable of operating with charging voltages compatible with voltages which are required in conventional integrated circuit applications.

According to the present invention a variable threshold, dual insulator, insulated gate field effect transistor includes an insulating layer between the gate metalization and a barrier layer which is disposed adjacent to the surface of the transistor substrate, the insulating layer having a dielectric constant in excess of 18. According further to the invention, dielectric materials for use in the insulating layer may comprise strontium titanate ($SrTiO_3$); titanium dioxide ($TiO_2$); lead zirconate ($PbZrO_3$); refractory metal oxides, such as hafnium dioxide ($HfO_2$), zirconium dioxide ($ZrO_2$), tantalum oxide ($Ta_2O_5$), and tungsten oxide ($WO_3$); rare earth metal oxides; and ferroelectrics and antiferroelectrics.

The present invention provides a variable threshold IGFET charge storage memory element which is capable of being charged with voltages on the same order of magnitude as voltages commonly used in conventional integrated circuit technology; said voltages are typically on the order of 5 to 20 volts.

Further, because the present invention provides an insulating layer of a higher dielectric constant, not only is the charging voltage lower, but the internal fields across the insulating layer will be lower than those known to the prior art. This results in superior charge retention characteristics (longer memory life).

Other objects, features and advantages of the present invention will become more apparent in the light of the following detailed description of preferred embodiments thereof as illustrated in the accompanying drawing.

BRIEF DESCRIPTION OF THE DRAWING

The sole FIGURE herein comprises a simplified, illustrative, side elevation sectional view of a variable threshold dual insulator, insulated gate field effect transistor charge storage memory element in accordance with the present invention.

DESCRIPTION OF THE PREFERRED EMBODIMENT

Referring to the drawing, a variable threshold, dual insulator IGFET charge storage memory element, of the p-channel enhancement mode type, comprises a substrate 1 of n-type conductivity monocrystalline silicon and a source 2 and a drain 3 of p-type conductivity monocrystalline silicon. Between the gate metalization 4 and the substrate 1 is an insulation layer 5 and a barrier layer 6 with an interface 7 therebetween. This configuration is known to the prior art, and is one form in which the present invention may be embodied. A charging voltage $V_c$ may be applied between a terminal 8 and the substrate 1, which is grounded (9). As is known, differences in the molecular structure of the adjacent molecules of the two types of oxides at the interface 7 of the barrier layer 6 and the insulation layer 5 result in structural disorders which form charge-trapping sites in the vicinity of the interface 7, due to defects in the structure, such that charges can readily be accepted and driven off. By applying a suitably high charging voltage $V_c$ across the gate metalization 4 and the substrate 1, charges can be either attracted to the traps in the interface 7 or driven from the traps in the interface 7, depending on the polarity of the charging voltage $V_c$ (the traps are thus filled or emptied). The presence of charges in the interface alters the threshold required on the insulated gate to cause conduction between the source and drain. The quantity of charge or charge depletion which is introduced at the interface 7 is a function of the voltage amplitude and pulse duration. Use of a positive charging voltage $V_c$ attracts charge to the interface. This in turn leaves holes between the source and the drain. In a p-channel device (as illustrated in the FIGURE), a positive voltage can be applied in such a way so as to introduce sufficient negative charge to have the device normally on or to have the threshold lowered so it would be more easily turned on. On the other hand, similar negative charge induced in an n-channel type device formed on a p-substrate raises the threshold.

Such devices may have a relatively thin barrier layer 6, which may for instance be silicon dioxide, in which case the electrons tunnel through the barrier layer if the barrier layer is on the order of 35 A or less. For silicon dioxide layers in excess of about 35 A, Fowler- Nordheim emission would be the dominant charge transfer mechanism.

Further, detailed description of this type of storage device is given in the following references:

1. Ross, E. C., Goodman, A. M. and Duffy, M. T., "Operational Dependence Of The Direct-Tunnelling Mode MNOS Memory Transistor On The $SiO_2$ Layer Thickness," RCA Review, September 1970, Pgs. 467–478.
2. Goodman, A. M., Ross, E. C., and Duffy, M. T., "Optimization Of Charge Storage In The MNOS Memory Device," RCA Review, June 1970, Pgs. 342–354.
3. Chou, N. J. and Tsang, P. J., "Charge Storage Phenomena In Alγ -$Al_2O_3$-$SiO_2$-Si Structures," Metallurgical Transactions, Volume 2, March 1971, Pgs. 659–665.
4. Task 6-Development of MNOS Technology NAS 9–6636, Westinghouse Defense and Space Center, Baltimore, Maryland, 20 March 1970 (Federal Clearinghouse Accession No. N70–27 120; NASA CR No. CR–108404).

All of the characteristics described hereinbefore are known in the art.

From Maxwell's equations, it is known that the charge at the interface is equal to the difference in the dielectric displacement the insulating layer ($D_i$) and the dielectric displacement of the barrier layer ($D_b$). However, when initially applying a charging voltage to the memory element, there is no charge at the interface 7 so that the two dielectric displacements are equal. The dielectric displacement is the product of the dielectric constant and the field across the dielectric. Therefore, the product of the dielectric constant and field in the insulating layer ($E_i K_i$) is equal to the product of the dielectric constant and the field in the barrier layer ($E_b K_b$). The charging voltage, $V_c$, is equal to the sum of the voltage drops from the terminal 8 through the substrate 1. Since the voltage drop in the substrate 1 is negligible due to its high conductivity, and ignoring surface potentials which are equally small, the required charging voltage can be expressed as $$V_c = E_i X_i + E_b X_b \quad (1)$$

where $X_i$ and $X_b$ are the thicknesses of the insulating and barrier layers, respectively. However, since $$E_i K_i = E_b K_b \quad (2)$$

then $$E_i = (K_b / K_i)\, E_b \quad (3)$$

so $$V_c = E_b [X_b + (K_b / K_i)\, X_i] \quad (4)$$

The second term of equation (4) is the voltage required to charge the insulation layer 5. This is proportional to the ratio of the dielectric constants, and the thickness of the insulation layer. If the insulation layer is made very thin, then the charging voltage can be reduced: however, this results in a short insulation path so that the charge in the interface 7 will leak off to the gate metalization 4 much more rapidly. On the other hand, the voltage required can be reduced by reducing the ratio of the dielectric constants. This can be done by selecting a dielectric material for the insulation layer 5 which has a very high dielectric constant $K_i$. In this fashion, not only is the charging voltage reduced, but the charge retaining properties of the layer are good. The following chart is illustrative of the properties of exemplary dielectrics.

| insulator | dielectric constant | $E_i$ for $E_b$ of $E_o \cong 10^7$ V/CM | $V_c$ for $E_b$ of $E \sim 10^7$ V/CM | FILM Thickness |
|---|---|---|---|---|
| $SiO_2$ | 3.9 | · | | 20 A |
| $Si_3N_4$ | 6.5 | $6\times10^5$ V/CM | 62 V | 1,000 A |
| $Al_2O_3$ | 9.5 | $4\times10^5$ V/CM | 43 V | 1,000 A |
| $TiO_2$ | 80 | $4.9\times10^4$ V/CM | 4.9 V | 1,000 A |

It can be seen that the utilization of titanium dioxide ($TiO_2$) in favor of silicon nitride ($Si_3N_{4-l}$ ) *or aluminum oxide* (*Al*2$O_3$) reduces the required charging voltage by an order of magnitude. A preferred material may comprise $SrTiO_3$ which has a dielectric constant of about 200. In fact, a number of materials having dielectric constants in excess of eighteen are available, and as easily can be seen, thereby will provide at least a 50 percent reduction in the required charging voltage. Such materials are strontium titanate ($SrTiO_3$), titanium dioxide ($TiO_2$), lead zirconate ($PbZrO_3$), refractory metal oxides, such as hafnium dioxide ($HfO_2$), zirconium dioxide ($ZrO_2$), tantalum oxide ($Ta_2O_5$), and tungsten oxide ($WO_3$), rare earth metal oxides, and ferroelectrics and antiferroelectrics.

The invention is thus simply expressed as the use of an insulation layer between a barrier layer and the gate metalization in a variable threshold, dual insulator IGFET charge storage memory device, which has a high dielectric constant. Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. In a variable threshold, dual insulator, insulated gate field effect transistor charge storage memory element of the type having a barrier layer which is disposed adjacent to the surface of the transistor substrate, and an insulation layer disposed between the barrier layer and the gate metalization, the improvement in which said insulation layer comprises strontium titanate ($SrTiO_3$).

2. In a variable threshold, dual insulator, insulated gate field effect transistor charge storage memory element of the type having a barrier layer which is disposed adjacent to the surface of the transistor substrate, and an insulation layer disposed between the barrier layer and the gate metalization, the improvement in which said insulation layer comprises lead zirconate ($PbZrO_3$).

* * * * *